United States Patent [19]
Jayant et al.

[11] Patent Number: 4,617,676
[45] Date of Patent: Oct. 14, 1986

[54] PREDICTIVE COMMUNICATION SYSTEM FILTERING ARRANGEMENT

[75] Inventors: Nuggehally S. Jayant, Short Hills, N.J.; Venkatasubbarao Ramamoorthy, Linköping, Sweden

[73] Assignee: AT&T Bell Laboratories, Murray Hill, N.J.

[21] Appl. No.: 646,971

[22] Filed: Sep. 4, 1984

[51] Int. Cl.$^4$ .......................... G10L 9/14; H04B 14/06
[52] U.S. Cl. ...................... 375/27; 375/122; 381/30; 381/31
[58] Field of Search ............... 358/135, 138; 375/27, 375/30, 31, 32, 33, 34, 122; 381/29, 30, 31, 32

[56] References Cited

U.S. PATENT DOCUMENTS

| | | | |
|---|---|---|---|
| 3,631,520 | 12/1971 | Atal | 381/30 |
| 3,715,512 | 2/1973 | Kelley | 381/31 |
| 3,750,024 | 7/1973 | Dunn et al. | 381/31 |
| 4,133,976 | 1/1979 | Atal et al. | 381/30 |
| 4,411,003 | 10/1983 | Su | 381/32 |
| 4,491,953 | 1/1985 | Bellisio et al. | 375/27 |

*Primary Examiner*—Benedict V. Safourek
*Attorney, Agent, or Firm*—Jack S. Cubert

[57] ABSTRACT

A digital communication system includes a predictive decoder that is operative to convert received digital codes into a predictively decoded signal, e.g., speech signal, and to generate a set of predictive parameter signals and a signal representative of the communication system bit rate. A set of filter control signals is generated responsive to the communication bit rate signal. The predictively decoded signal is passed through a filter which modifies the output signal responsive to the filter control signals and the decoder predictive parameter signals to improve the output signal quality. The filter control signals selectively alter the predictive parameter signals to optimize the predictively decoded signal modification for the current transmission bit rate.

23 Claims, 9 Drawing Figures

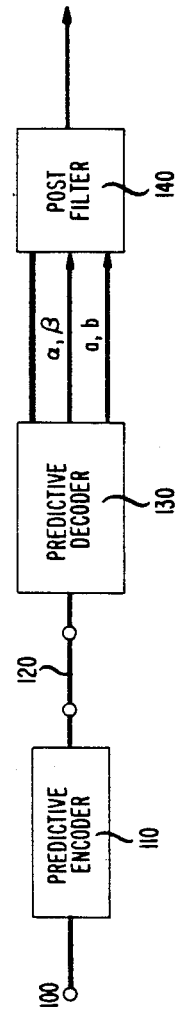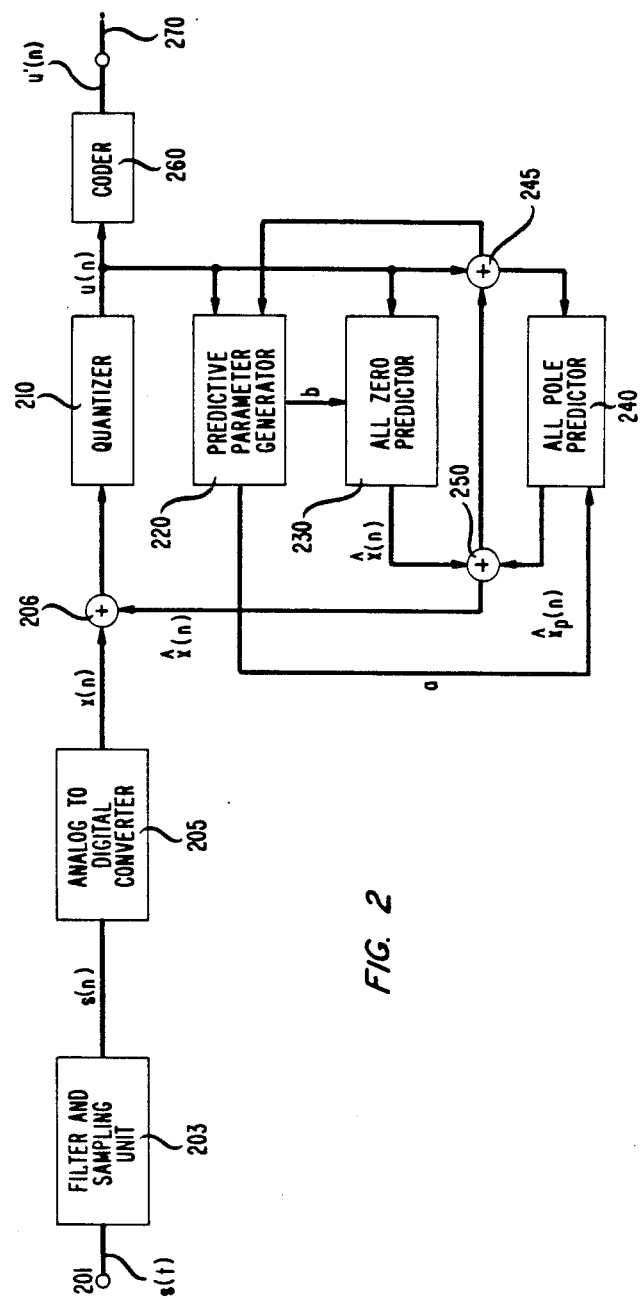

PREDICTIVE COMMUNICATION SYSTEM FILTERING ARRANGEMENT

TECHNICAL FIELD

Our invention relates to digital communication and more particularly to signal processing adapted to reduce noise effects in digital communication systems.

BACKGROUND OF THE INVENTION

Coding of signals for transmission over a digital channel generally includes sampling an input, quantizing the samples, and forming a digital code for each quantized sample. A replica of the input is produced by decoding the digital codes corresponding to the input into a time sequence of signal samples and low pass filtering the sample sequence. As is well known in the art, some types of signals such as speech patterns are highly correlated so that portions thereof can be predicted from past values. By taking advantage of the predictive nature of such signals, the channel bit rate may be substantially reduced.

Predictive coding of signals as disclosed in U.S. Pat. No. 3,631,520, issued to B. S. Atal, Dec. 28, 1971, and assigned to the same assignee, involves the generation of predictive parameters from a succession of signal samples and the formation of a predicted value for each sample from the generated parameters and the preceding signal samples. The difference between each sample and its predicted value is quantized, encoded and sent to a receiver wherein the difference signal is decoded and combined with the corresponding predictive value formed in the receiver.

Quantizing a signal sample is accomplished as is well known by selecting the closest of a set of specified amplitude levels. The approximation introduced by quantization, however, results in noiselike distortion. Such quantization noise may be reduced by forming an error signal corresponding to the difference between the quantized and unquantized signals and modifying the signal samples in a prescribed manner responsive to the error signal. While the total quantizing noise level is unaffected by the modification, the noise may be reshaped so that it is concentrated in a specific portion of the signal spectrum where its effects are minimized. For speech signals, quantizing noise may be concentrated in formant regions of the speech signal spectrum. This results in the noise being masked so that it is not perceived by the listener.

U.S. Pat. No. 4,133,976 issued to B. S. Atal et al, Jan. 9, 1979, and assigned to the same assignee discloses a circuit adapted to redistribute quantizing noise in a speech signal spectrum during the digital encoding of the signal. The use of such a circuit in a digital coding scheme results in a significant reduction in the perceived quantizing noise. The circuit arrangements, however, are relatively complex and require that the communication system operate at a predetermined bit rate. It is an object of the invention to provide improved digital signal coding that reduces quantizing noise effects for communication at a variable bit rate.

BRIEF SUMMARY OF THE INVENTION

The invention is directed to a signal communication system having a predictive decoder for generating a predictively decoded signal, and apparatus for generating a set of predictive parameter signals and a signal representative of the communication system bit rate. A plurality of control signals is produced responsive to said communication system bit rate signal and the predictively decoded signal is modified responsive to said control signals and said predictive parameter signals.

According to one aspect of the invention, the modifying arrangement is a spectral modifying arrangement that includes a spectral filter for enhancing spectral regions having predictively decoded signal components and suppressing the remaining spectral regions responsive to the predictive parameter signals and the detected bit rate. Advantageously, the signal to background noise ratios in the spectral regions is improved and the residual noise spectrum is perceived as signal-like in the predictively decoded signal spectral regions.

BRIEF DESCRIPTION OF THE DRAWING

FIG. 1 depicts a general block diagram of a digital speech communication arrangement illustrative of the invention;

FIG. 2 shows a block diagram of an adaptive differential pulse code modulation coder that may be used in the circuit of FIG. 1;

DETAILED DESCRIPTION

Figure 3:
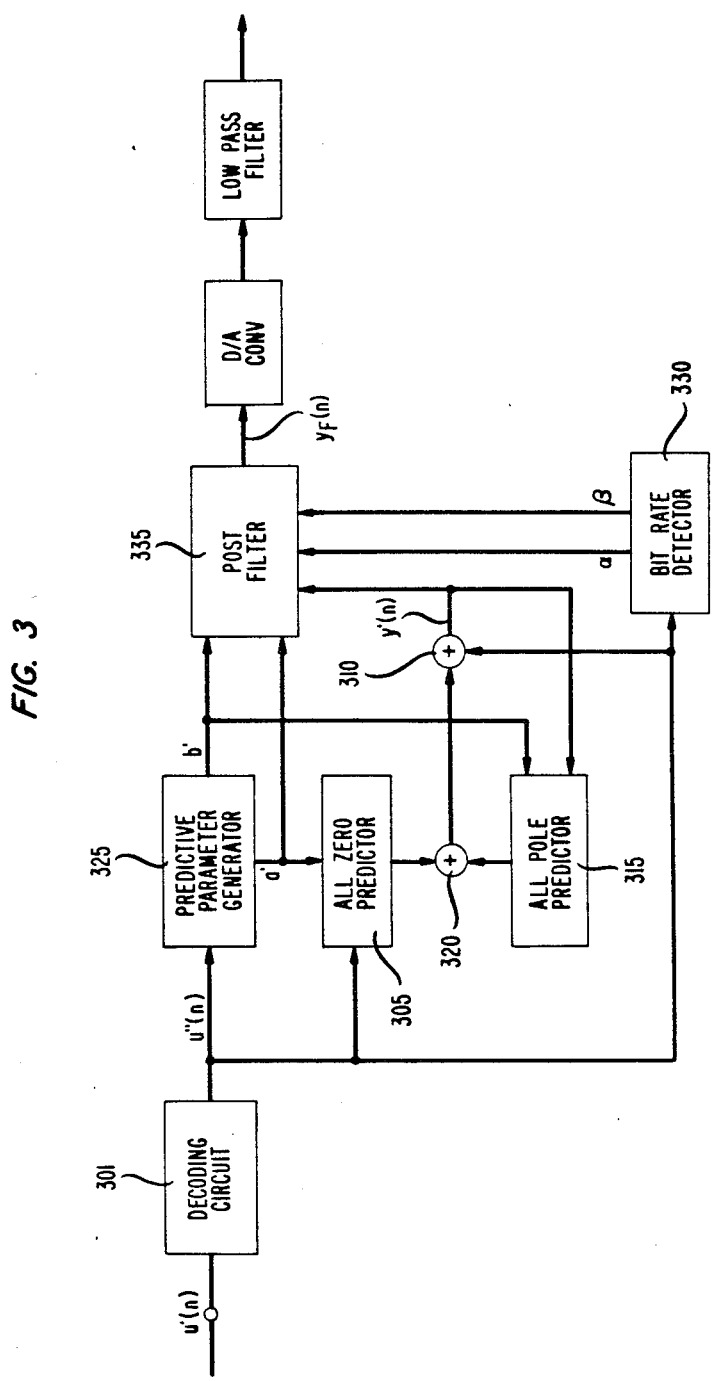
FIG. 3 shows a block diagram of an ADPCM decoder that may be used in the circuit of FIG. 1 in accordance with the invention.

A general block diagram of a digital speech communication system illustrative of the invention is shown in FIG. 1. Referring to FIG. 1, a speech signal is converted into an analog electrical signal by transducer 100. Predictive encoder 110 is operative to generate a sequence of digital coded signals corresponding to the analog signal from transducer 100. As is well known in the art, coder 110 is adapted to take advantage of the redundancy inherent in a speech pattern to reduce the digital code rate required for transmission. The coder includes circuitry for generating a set of predictive parameters for each successive time frame interval of the input signal and for forming a sequence of coded signals for the interval responsive to the predictive parameters and the successive signal samples of the interval. The coded signals are transmitted over digital channel 120 and are received by digital decoder 130.

Decoder 130 is operative to produce predictive parameters from the received coded signals and to combine the coded signals with the predictive parameters to generate a sequence of coded signals that correspond to the signal applied to encoder 110. The output of decoder 130 contains noise that results from the quantization of the input signal in coder 110. In accordance with the invention, post filter 140 is adapted to modify the output signal from decoder 130 so that the effect of quantizing noise on the quality of the output signal is mitigated. This is accomplished by applying the predictive parameter signals a,b developed in decoder 130 and a signal $\alpha,\beta$ corresponding to the current bit rate of the transmission channel to post filter 140 and shaping the post filter characteristics jointly responsive to the predictive parameters and the bit rate.

The predictive parameters from decoder 130 are indicative of the spectrum of decoder output signal and may be used to enhance the output signal spectral portions and to suppress other portions of the spectrum. The bit rate corresponding signal $\alpha,\beta$ determines the degree to which the output signal from decoder 130 is to be modified by the predictive parameters. The bit rate corresponding signals are required in digital communication systems where the bit rate is adjusted to accommodate the traffic on the transmission channels. While the post filter of FIG. 1 is shown as apparatus independent of the decoder, it may also be part of the decoder so that the decoder signals needed for the post filter operation can be efficiently utilized.

FIG. 2 shows a predictive speech encoding circuit that may be used in the circuit of FIG. 1. A speech signal s(t) is supplied from transducer 201 to filter and sampling circuit 203 in which signal s(t) is filtered and sampled at a predetermined rate. Circuit 203 may comprise a low pass filter with a cut off frequency of 4 kHz and a sampler having a sampling rate of 8 kHz. The successive samples s(n) from filter and sampling circuit 203 are applied to analog-to-digital converter 205 wherein a digital code x(n) is produced for each sample s(n). A coded signal representative of the predicted value of signal $\bar{x}(n)$ is generated $$\bar{x}(n) = \bar{x}_z(n) + \bar{x}_p(n) \tag{1a}$$

where $$x_p(n) = \sum_{j=1}^{2} a_j(n)y(n-j) \tag{1b}$$

$$x_z(n) = \sum_{j=1}^{6} b_j(n)u(n-j) \tag{1c}$$

and y(n) is the reconstructed output. $\bar{x}(n)$ is subtracted from signal x(n) in summing circuit 206. The resulting difference signal is quantized in quantizer 210 and the quantized signal is coded at a selected bit rate in coder 260. The coded signal u'(n) is then applied to transmission channel 270.

The predictive signal generating arrangements in FIG. 2 to reduce redundancy in signal u(n) include predictive parameter generator 220, all zero predictor 230, all pole predictor 240 and summing circuits 245 and 250. Predictive parameter signal generator 220 is operative to form pole and zero predictive signals in accordance with $$a_j(n) = \lambda_j a_j(n-1) + \mu_j sgn[(u(n-1)]sgn[y(n-1-j)] \tag{2}$$

$$j = 1,2, \lambda_1 = \frac{511}{512}, \lambda_2 = \frac{255}{256}, \mu_1 = \mu_2 = 0.008$$

$$b_j(n) = \lambda_j^1 b_j(n-1) + \mu_j^1 sgn[u(n-1)]sgn[u(n-1-j)] \tag{3}$$

$$j = 1 \text{ to } 6, \lambda_j^1 = \frac{255}{256}, \text{ and } \mu_j^1 = 0.008 \text{ for all } j.$$

The predictive parameter generator may comprise a microprocessor arrangement such as the TMS 320 signal processor device produced by Texas Instruments having a permanently stored set of instructions adapted to perform the parameter generation. Any of the well known predictive parameter generation arrangements may also be used. All zero predictor 230 is adapted to produce a signal in accordance with equation 1(c).

Figure 7:
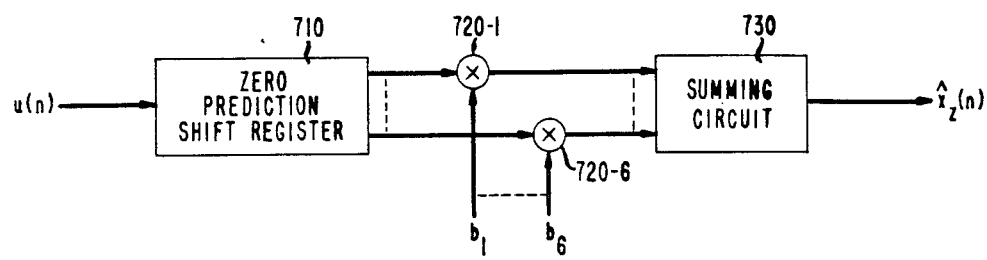
FIG. 7 shows a detailed block diagram of a circuit that may be used as a zero pole predictor in FIGS. 2 and 3.

The all zero predictor may comprise the circuit shown in FIG. 7 which includes shift register 710, multiplier circuits 720-1 through 720-6 and summing circuit 730. In FIG. 7, the signal u(n) is applied to the input of shift register 710 and is successively delayed therein. The delayed outputs from the shift register are multiplied by coefficients $b_j$ in circuits 720-1 through 720-6. The multiplier outputs are summed in adder 730 to form signal $x_z(n)$.

Figure 8:
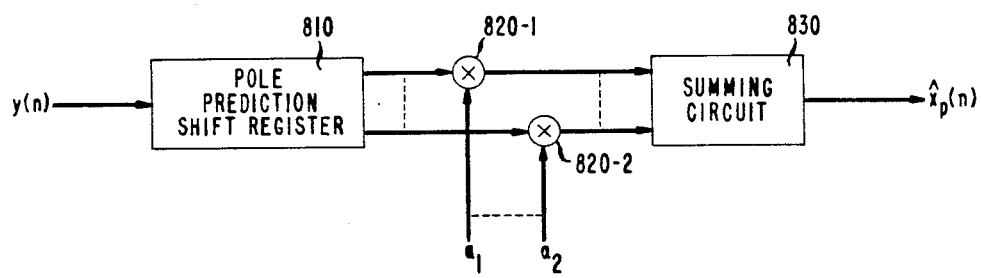
FIG. 8 shows a detailed block diagram of a circuit that may be used as an all pole predictor in FIGS. 2 and 3.

All pole predictor 240 generates the output signal $x_p(n)$ of equation (1b). The all pole predictor may be implemented in the arrangement shown in FIG. 8. Referring to FIG. 8, signal y(n) is supplied to delay shift register 810 and the successively delayed outputs therefrom are multiplied by coefficients $a_j$ in multipliers 820-1 and 820-2. The multiplier output signals are summed in adder 830 to form the $x_p(n)$.

The quantized difference signal from quantizer 210

$$u(n) = Q[x(n) - \bar{x}(n)] \tag{4}$$

is applied to predictive parameter signal generator 220, all zero predictor 230 and summing circuit 245. Predictive parameter generator 220 combines the quantized difference signal and output of summer 245 to form the set of zero prediction parameters a and the set of pole prediction parameters b in accordance with equations (2) and (3). The a parameter signals are supplied to all pole predictor 240 and the b parameter signals are supplied to all zero predictor 230.

Predictor 230 modifies the quantized difference signal and applies its output $x_z(n)$ to summing circuit 250. Predictor 240 receives the output of summer 245 and provides the pole prediction signal $x_p(n)$ to summer 250. The current predicted output signal $\bar{x}(n)$ is then applied to summer 206.

Figure 9:
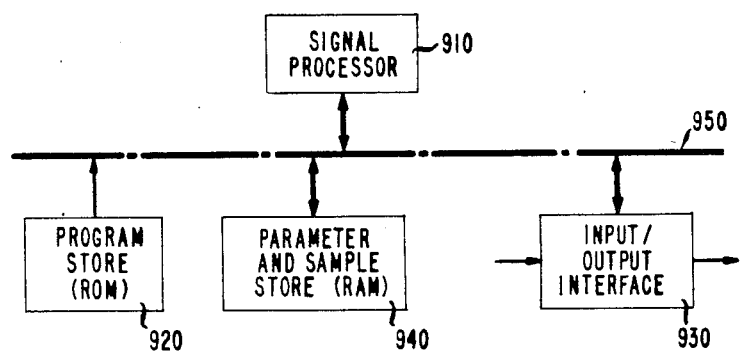
FIG. 9 shows an alternative circuit that may be used as the decoder in FIG. 1.

Alternatively, the functions of the adaptive encoder of FIG. 2 may be performed in a signal processor arrangement such as shown in FIG. 9. The arrangement includes bus 950, microprocessor 910 which may be the type TMS 320 signal processor device, a read only memory 920 having permanently stored program instructions therein known in the art to control the predictive encoding process, input-output interface circuit 930 and random access memory 940.

Coder 260 in FIG. 2 is adapted to convert the digital signal from quantizer 210 into a digital code suitable for transmission over channel 270 at a selected bit rate. This bit rate may be adjustable to accommodate the traffic on the channel. The channel bit rate may be 4 bits per output signal from quantizer 210 under normal traffic conditions but could be reduced to 3 or 2 bits as the traffic is increased. As is well known in the art, the quality of the transmitted signal decreases with decreasing bit rate. In accordance with the invention, the predictive characteristics of the speech signal and the transmission bit rate are utilized in a filter associated with the decoder to maintain signal quality. While quantizing noise filtering has been included in prior art encoders, such filtering increases the cost and complexity of the encoder and does not readily accommodate changing transmission channel bit rates.

Digital decoder 130 is shown in greater detail in the block diagram of FIG. 3. As illustrated in FIG. 3, signal u"(n) from decoding circuit 301 is supplied to summing circuit 310, all zero predictor 305, predictive parameter generator 325 and bit rate detector 330. Predictive parameter generator 325 reconstructs the predictive parameter signals a and b responsive to the succession of u"(n) signals applied thereto in accordance with equations (2) and (3).

All zero predictor 305 is operative responsive to signal u"(n) and predictive parameter signals a' from generator 325 to produce an all zero predictive signal in accordance with equation 1(c). The zero predictive signal is summed with the output of all pole predictor 315 in summing circuit 320 and the total predictive signal is supplied to an input of summer 310. The sum of the input signal u"(n) and the predictive signal from summer 320 formed in summer 310 is supplied as an input to all pole predictor 315. The all pole predictor operates to modify the output from summer 310 responsive to pole predictive parameter signals b' from generator 325. All of the decoder operations may also be accomplished using the processor apparatus of FIG. 9 in accordance with the permanently stored instructions of Appendix A to perform the decoder functions.

Bit rate detector 330 is adapted to provide a set of filter control signals $\alpha, \beta$ to the post filter responsive to the received codes from the transmission channel. In packet transmission systems well known in the art, the bit rate information may be added to each packet and the bit rate detector provides a selected set of control signals for each bit rate. The detector may comprise any of the well known code detectors known in the art.

The decoder predictive output signal y'(n) is obtained from summer 310 and constitutes a digital coded replica of the speech signal applied to summing circuit 206 of the encoder of FIG. 2. This replica, however, also includes quantizing noise and transmission channel noise that degrades intelligibility. Post filter 335 in FIG. 3 modifies signal y'(n) so as to enhance the signal spectral portions and attenuate nonsignal spectral portions determined by zero predictive parameter signal and the pole predictor parameter signals from generator 325 to the degree specified by bit rate parameter signals $\alpha$ and $\beta$ from bit rate detector 330.

Figure 4:
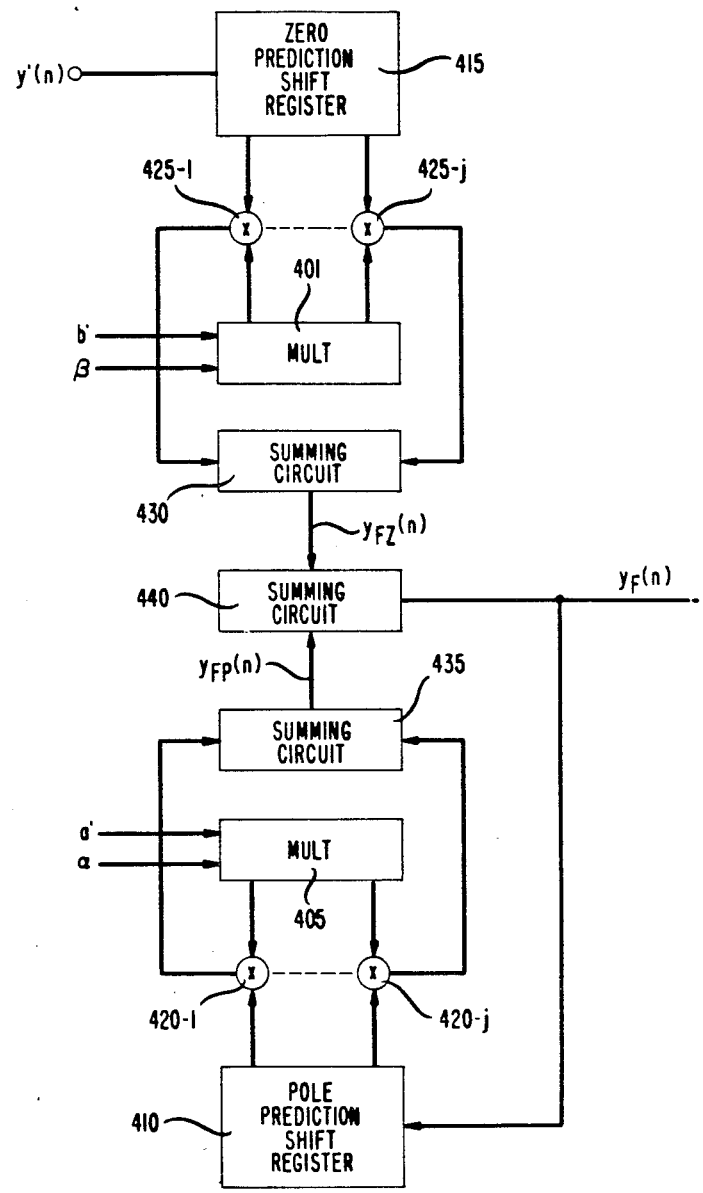
FIG. 4 shows a detailed block diagram of a post filter circuit illustrative of the invention.

A detailed block diagram of the post filter is depicted in FIG. 4. The circuit of FIG. 4 includes multiplier circuits 401 and 405, pole prediction shift register 410 and associated multiplier circuits 420-1 through 420-j, zero prediction shift register 415 and associated multiplier circuits 425-1 through 425-j, and summing circuits 430, 435 and 440.

Referring to FIG. 4, signal $\alpha$ from bit rate detector 330 is multiplied by pole predictive parameter signal a' in multiplier 405 to form a set of signals $$a_j'(n)\alpha^j \text{ for } j=1 \text{ to } 2 \tag{5}$$

which signals are supplied to multiplier circuits 420-1 to 420-j. The output of the post filter, signal $y_F(n)$, is applied to the input of zero prediction shift register 410 and the successively delayed outputs therefrom are combined with the signals from multiplier 401 in multiplying circuits 420-1 to 420-j. The signals from multipliers 420-1 to 420-j are then summed in summing circuit 435 to form signal $$y_{FP}(n) = \sum_{j=1}^{2} a_j'(n)\alpha^j y_F(n-j). \tag{6}$$

The output of summing circuit 435, $y_{Fp}(n)$, is added to the output of summing circuit 430 in summing circuit 440 and the resulting signal, $y_F(n)$ is transmitted to the input of pole shift register 410.

Multiplier 401 is operative to form the product signal $$b_j'(n)\beta^j \text{ for } j=1 \text{ to } 6 \tag{7}$$

where $\beta$ is obtained from bit rate detector 330 and $b_j'$ is the zero predictive parameter signal set from predictive parameter generator 325. The output speech signal from the decoder of FIG. 3 is applied to zero prediction shift register 415. Product signals from multiplier 401 are multiplied by the delayed outputs of zero predictor shift register 415 in multiplier circuits 425-1 through 425-j and the resultant signals are summed in summing circuit 430 to form signal $$y_{FZ}(n) = \sum_{1}^{6} b_j'(n)\beta^j y'(n-j). \tag{8}$$

The output of the post filter circuit of FIG. 4, signal $y_F(n)$ corresponds to $$\begin{aligned} y_F(n) &= y_{FZ}(n) + y_{FP}(n) \\ &= \sum_{1}^{2} a_j'(n)\alpha^j y_F(n-j) + \sum_{1}^{6} b_j'(n)\beta^j y'(n-j). \end{aligned} \tag{9}$$

Where the processor of FIG. 9 is utilized to perform the decoder operations illustrated in FIG. 3, the post filter may be implemented by adding further instructions to the program memory of FIG. 9. A set of such instructions is set forth in FORTRAN language in Appendix B attached hereto.

Figure 5:
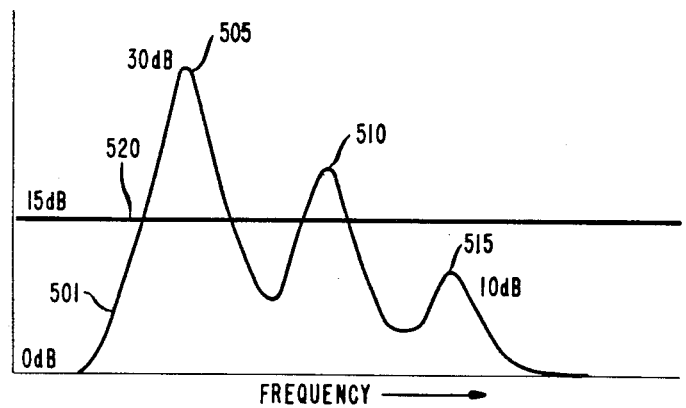
FIG. 5 shows waveforms illustrative of signal spectra obtained from the decoder circuit of FIG. 3.

FIG. 5 illustrates the effect of the post filter circuit of FIG. 4 on the output of the decoder of FIG. 3. Waveform 501 shows the spectrum of a speech signal at the output of a predictive decoder. The speech signal includes formant regions having peaks 505, 510, and 515 as indicated. Formant peak 505 is 30 db and the formant peak 515 is 10 db. The flat noise spectrum of 15 db at the decoder output is illustrated in waveform 520. The noise level in the regions outside formant regions is relatively high and reduces the quality of the speech signal.

Figure 6:
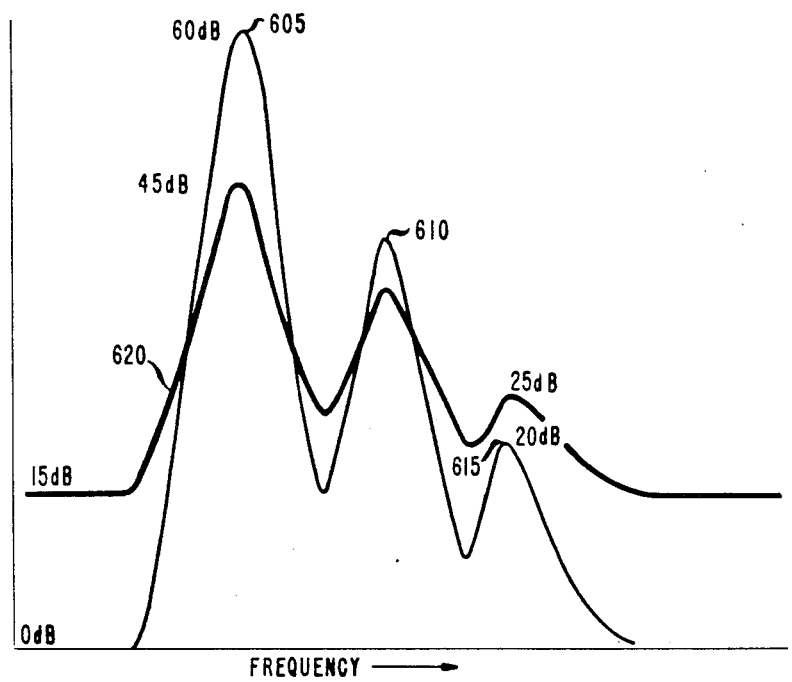
FIG. 6 shows waveforms illustrative of signal spectra obtained from the filter circuit of FIG. 4.

The post filter is operative to modify the speech signal and noise as illustrated in FIG. 6. The speech signal appearing at the output of the post filter is shown in waveform 601 and includes formant regions having peaks 605, 610 and 615. The shape of the speech signal spectrum is modified so that the formant peaks are raised as indicated. The noise spectrum of waveform 620 is modified so that the noise is enhanced within the formant regions and attenuated outside the formant regions. As is evident from a comparison of FIGS. 5 and 6, the use of filter increases the signal to background noise ratio and redistributes the noise so that its perceived effect is mitigated.

Filter control signals $\alpha$ and $\beta$ are selected to suit the bit rate of the transmission system. The selection of the filter control signals is based on the degree of predictive filtering that is desired for the current bit rate. Subjective listening tests show that particular values of $\alpha$ and β provide good quality speech signals. Where the bit rate is 4 bits per transmitted code, α and β may be in the range of 0.0 to 0.1. In the event that the bit rate changes to 3 bits per transmitted code, α may be set to approximately 0.2 and β may be set to approximately 1.0. If the detected bit rate changes to 2 bits per transmitted code both α and β should be altered to be approximately 1.0.

The invention has been described with reference to a particular embodiment thereof. It is to be understood, however, that various changes and modifications may be made by those skilled in the art without changing the scope or spirit of the invention.

APPENDIX A
PROGRAM FOR ADPCM DECODER

```
C       Assumes data is processed in blocks of 256
C       samples.
Dimensioned Quantities with negative indices are appropriate
        values from preceding block.
C       Input to system is the sequence of quantized
C       prediction error amplitudes, U(N)
C       Output of pole-predictor is XP(N)
C       Output of zero-predictor is XZ(N)
C       Output of ADPCM decoder is Y(N)
        COMMON /COEFF/ A(J,N) ,B(J,N)
        DIMENSION U(256), XZ(256),
        XP(256), XP(256),
        XZ(256), Y(256), YF(256)
        DIMENSION A(2,256), B(6,256)
        DO 1 N = 1,256
        DO 100 J = 1,2
100     A(J,N) = A(J,N-1) *
        (511/512) + .008 * SIGN(1.0,
        U(N-1)) * SIGN(1.0, Y(N-1-J))
        DO 200 J = 1,6
200     B(J,N) = B(J,N-1) *
        (255/256) + .008 * SIGN(1.0,
        U(N-1)) * SIGN(1.0, U(N-1-J))
        XP(N) = 0.
        DO 300 J = 1,2
300     XP(N) = A(J,N) * Y(N-J) + XP(N)
        XZ(N) = 0.
        DO 400 J = 1,6
400     XZ(N) = B(J,N) * U(N-J) + XZ(N)
        Y(N) = XP(N) + XZ(N) + U(N)
1       CONTINUE
```

APPENDIX B
PROGRAM FOR ADPCM POST FILTER

```
C       Input of post filter is Y(N)
C       Output of post filter is YF(N)
        COMMON /COEFF/ A(J,N),B(J,N)
        DIMENSION A(2,256), B(6,256),
        Y(256), YF(256)
        DO 11 N=1,256
        YFZ = 0.
        DO 500 J = 1,6
500     YFZ = B(J,N) * (BETA**J) * Y(N-J) + YFZ
        YFP = 0
        DO 600 J = 1,2
600     YFP = A(J,N) * (ALPHA**J) * YF(N-J) + YFP
        YF(N) = YFZ + YFP
11      CONTINUE
```

What is claimed is:

1. In a digital communication system having at least one transmission channel, decoder means for producing a speech representative signal responsive to digital codes received from said transmission channel, means for generating predictive parameter signals responsive to said received digital codes, and means for producing a first signal representative of the number of bits in each transmission channel digital code, a method for modifying the speech representative signal produced by said decoder means comprising the steps of:

generating a plurality of spectral filter control signals responsive to said first signal; and filtering the speech representative signal from said decoder means to enhance selected spectral regions of the speech representative signal and suppressing other spectral regions responsive to said spectral filter control signals and said generated predictive parameter signals.

2. In a digital communication system having at least one transmission channel, decoder means for producing a speech representative signal responsive to digital codes received from said transmission channel, means for generating predictive parameter signals responsive to said received digital codes, and means for producing a first signal representative of the number of bits in each transmission channel digital code, a method for modifying the speech representative signal produced by said decoder means according to claim 1 wherein said enhancing and suppressing step comprises enhancing formant spectral regions of the speech representative signal from said decoder means and attenuating spectral regions of the speech representative signal from said decoder means outside said formant spectral regions responsive to said spectral filter control signals and said generated predictive parameter signals.

3. In a digital communication system having at least one transmission channel, decoder means for producing a speech representative signal responsive to digital codes received from said transmission channel, means for generating predictive parameter signals responsive to said received digital codes, and means for producing a first signal representative of the number of bits in each transmission channel digital code, a method for modifying the speech representative signal produced by said decoder means according to claim 2 wherein said received digital codes are ADPCM codes.

4. In a digital communication system having means for producing a predictively decoded signal responsive to received digital codes, means for generating zero and pole predictive parameter signals responsive to said received digital codes, and means for producing a signal representative of the communication system bit rate, a method for modifying the predictively decoded signal comprising the steps of:

generating zero predictive filter control signals and pole predictive filter control signals responsive to the communication system bit rate;

combining said zero predictive filter control signals with said zero predictive parameter signals to form a set of zero predictive spectral shaping parameter signals;

combining said pole predictive filter control signals with said pole predictive parameter signals to form a set of pole predictive spectral shaping parameter signals; and modifying the frequency spectrum of the predictively coded signals responsive to said zero predictive spectral shaping parameter signals and said pole predictive spectral shaping parameter signals.

5. In a digital communication signal having means for producing a predictively decoded signal responsive to received digital codes, means for generating predictive parameter signals responsive to said received digital codes, and means for producing a signal representative of the communication system bit rate, a method for modifying the predictively decoded signal according to claim 4 wherein said filter control signal generating step comprises assigning predetermined filter control signals to each bit rate of said communication system; and selecting a predetermined set of filter control signals responsive to said communication system bit rate signal.

6. In a digital communication system having means for producing a predictively decoded signal responsive to received digital codes, means for generating predictive parameter signals responsive to said received digital codes, and means for producing a signal representative of the communication system bit rate, a method for modifying the predictively decoded signal according to claim 4, or 5 wherein said predictively decoded signal is a speech representative signal.

7. A digital communication system having at least one transmission channel comprising:

a predictive decoder for producing a speech representative signal responsive to digital codes received from said transmission channel;

means for generating predictive parameter signals responsive to said received digital codes;

means for producing a first signal representative of the number of bits in each transmission channel digital code; and a filter for altering said speech representative signal produced by said predictive decoder;

said filter comprising:

means responsive to said first signal for generating filter control signals;

means for combining said filter control signals with said predictive parameter signals to form a set of predictive spectral shaping signals; and means responsive to said predictive spectral shaping signals for enhancing selected spectral regions of the speech-representative signal produced by said predictive decoder and attenuating the other spectral regions.

8. A digital communication system according to claim 8 wherein said means for enhancing selected spectral regions of the speech representative signal and attenuating the other spectral regions comprises means responsive to said spectral filter control signals and said generated predictive parameter signals for enhancing formant spectral regions of the speech representative signal and attenuating spectral regions outside said speech representative signal formant spectral regions.

9. A digital communication system comprising:

a predictive decoder for producing a predictively decoded signal responsive to received digital codes, means responsive to said received digital codes for generating zero and pole predictive parameter signals;

means for producing a signal representative of the communication system bit rate, and a filter for altering said predictively decoded signal;

said filter comprising:

means responsive to the communication system bit rate for generating zero predictive filter control signals and pole predictive filter control signals;

means for combining said zero predictive filter control signals with said zero predictive parameter signals to form a set of zero predictive spectral shaping parameter signals;

means for combining said pole predictive filter control signals with said pole predictive parameter signals to form a set of pole predictive spectral shaping parameter signals; and means responsive to said zero predictive spectral shaping parameter signals and said pole predictive spectral shaping parameter signals for modifying the frequency spectrum of the predictively coded signals.

10. A digital communication system according to claim 9 wherein said filter control signal generating means comprises means for assigning a predetermined set of filter control signals to each bit rate of said communication system; and means responsive to said communication system bit rate signal for selecting a predetermined set of filter control signals.

11. A digital communication system according to claim 9 or 10 wherein said predictively decoded signal is a speech representative signal.

12. In a digital speech communication system having at least one transmission channel comprising a predictive decoder including means for receiving digitally coded signals, means responsive to said received digital coded signals for generating a speech representative signal, predictive parameter signals, and a first signal representative of the number of bits in each received digital code, a method for modifying the said speech representative signal from said predictive decoder comprising the steps of:

generating a plurality of control signals responsive to said first signal;

forming a predictive shaping signal responsive to said predictive parameter signals and said control signals; and amplifying selected portions of the frequency spectrum of said speech representative signal from said predictive decoder and attenuating the remaining frequency spectrum portions of said speech representative signal responsive to said predictive spectral shaping signal.

13. In a digital speech communication system having at least one transmission channel comprising a predictive decoder including means for receiving digitally coded signals, means responsive to said received digital coded signals for generating a speech representative signal, predictive parameter signals, and a signal representative of the transmission channel bit rate, a method for modifying the said speech representative signal according to claim 12 wherein said amplifying and attenuating step comprises amplifying formant portions of the speech representative signal and attenuating other spectral portions of the speech representative signal.

14. In a digital communication system comprising a predictive decoder including means for receiving digitally coded signals, means responsive to said received digital coded signals for generating a predictively decoded signal, zero and pole predictive parameter signals, and a signal representative of the communication system bit rate, a method for modifying the predictively decoded signal comprising the steps of:

generating zero predictive filter control signals and pole predictive filter control signals responsive to the communication system bit rate:

combining said zero predictive filter control signals with said zero predictive parameter signals to form a set of zero predictive spectral shaping parameter signals;

combining said pole predictive filter control signals with said pole predictive parameter signals to form a set of pole predictive spectral shaping parameter signals; and modifying the frequency spectrum of the predictively coded signals responsive to said zero predictive spectral shaping parameter signals and said pole predictive spectral shaping parameter signals.

15. In a digital communication system comprising a predictive decoder including means for receiving digitally coded signals, means responsive to said received digital coded signals for generating a predictively decoded signal, predictive parameter signals, and a signal representative of the communication system bit rate, a method for modifying the predictively decoded signal according to claim 14 wherein said control signal generating step comprises generating a zero predictive control signal and a pole predictive control signal responsive to said communication bit rate signal; and said predictive spectral shaping signal forming step comprises combining said zero predictive control signal with said zero predictive parameter signals and combining said pole predictive control signal with said pole predictive parameter signals.

16. In a digital communication system comprising a predictive decoder including means for receiving digitally coded signals, means responsive to said received digital coded signals for generating a predictively decoded signal, predictive parameter signals, and a signal representative of the communication system bit rate, a method for modifying the predictively decoded signal according to claim 15 wherein said communication system has a variable bit rate; and said control signal generating step comprises storing a plurality of zero predictive control signals and a plurality of pole predictive control signals, and selecting a zero predictive control signal and a pole predictive control signal responsive to said communication bit rate signal.

17. In a digital communication system comprising a predictive decoder including means for receiving digitally coded signals, means responsive to said received digital coded signals for generating a predictively decoded output signal, predictive parameter signals, and a signal representative of the communication system bit rate, a method for modifying the predictively decoded signal according to claim 14, 5 or 6 wherein said predictively decoded signal is a speech representative signal.

18. A digital speech communication system having at least one transmission channel comprising:

a predictive decoder including means for receiving digitally coded signals from said transmission channel, means responsive to said received digital coded signals for generating a predictively decoded speech representative signal, predictive parameter signals, and means responsive to said received digital coded signals for generating a first signal representative of the number of bits in each received digital code;

means responsive to said first signal for generating a plurality of spectral control signals;

means responsive to said predictive parameter signals and said control signals for forming a predictive spectral shaping signal; and means responsive to said predictive spectral shaping signal for amplifying selected portions of the predictively decoded speech representative signal frequency spectrum and for attenuating the remaining portions of the said predictively decoded speech representative signal frequency spectrum.

19. A digital communication system according to claim 18 wherein said predictively decoded signal is a speech representative signal and said amplifying and attenuating means comprises means for amplifying formant portions of said predictively decoded speech representative signal and attenuating other spectral portions of said predictively decoded speech representative signal.

20. A digital communication system comprising:

a predictive decoder including means for receiving digitally coded signals, means responsive to said received digital coded signals for generating a predictively decoded signal, means responsive to the received digital codes for generating a set of zero predictive parameter signals and a set of pole predictive parameter signals, and means responsive to said received digital codes for generating a signal representative of the communication system bit rate;

means responsive to said communication system bit rate signal for generating a plurality of control signals;

means for forming a predictive spectral shaping signal responsive to said predictive parameter signals and said control signals; and means responsive to said predictive spectral shaping signal for amplifying selected portions of the predictively decoded signal frequency spectrum and for attenuating the remaining portions of said predictively decoded signal frequency spectrum.

21. A digital communication system according to claim 20 wherein said control signal generating means comprises means responsive to said communication bit rate signal for generating a zero predictive control signal and a pole predictive control signal; and said predictive spectral shaping signal forming means comprises means for combining said zero predictive control signal with said zero predictive parameter signals and means for combining said pole predictive control signal with said pole predictive parameter signals.

22. A digital communication system according to claim 21 wherein said communication system has a variable bit rate; and said control signal generating means comprises means for storing a plurality of zero predictive control signals and a plurality of pole predictive control signals, and means for selecting a zero predictive control signal and a pole predictive control signal responsive to said communication bit rate signal.

23. A digital communication system according to claim 20, 21, or 22 wherein said predictively decoded signal is a speech representative signal.

* * * * *

UNITED STATES PATENT AND TRADEMARK OFFICE
CERTIFICATE OF CORRECTION

PATENT NO. : 4,617,676
DATED : October 14, 1986
INVENTOR(S) : Nuggehally S. Jayant and Venkatasubbarao Ramamoorthy It is certified that error appears in the above-identified patent and that said Letters Patent is hereby corrected as shown below:

Column 4, line 16, "$x_z(n)$" should read --$\hat{x}_z(n)$--; line 18, "$x_p(n)$" should read --$\hat{x}_p(n)$--; line 24, "$x_p(n)$" should read --$\hat{x}_p(n)$--; line 27, "$x(n)$" should read --$\hat{x}(n)$--; line 39, "$x_z(n)$" should read --$\hat{x}_z(n)$; line 41, "$x_p(n)$" should read --$\hat{x}_p(n)$--; line 42 "$x(n)$" should read --$\hat{x}(n)$--.

Column 6, line 3, "$yFP(n) = \sum_{j=1}^{2} a'_j(n)\alpha^j yF(n-j)$" should read --$y_{FP}(n) = \sum_{j=1}^{2} a'_j(n)\alpha^j y_F(n-j)$--; line 24, "yFZ" should read --$y_{FZ}$--; line 30, "$yF(n) = yFZ(n) + yFP(n)$" should read --$y_F(n) = y_{FZ}(n) + y_{FP}(n)$--; line 31, "$yF(n - j)$" should read --$y_F(n-j)$--. Column 8, line 62, "signal" should read --system--.

Signed and Sealed this

Twenty-eighth Day of April, 1987

Attest:

DONALD J. QUIGG

Attesting Officer

Commissioner of Patents and Trademarks